(12) United States Patent
Hardtke et al.

(10) Patent No.: US 8,251,338 B2
(45) Date of Patent: Aug. 28, 2012

(54) CONSTANT BEARER

(75) Inventors: Hans-Herlof Hardtke, Zeven (DE);
 Heinz-Wilhelm Lange, Zeven (DE)

(73) Assignee: LISEGA Aktiengesellschaft, Zeven (DE)

( * ) Notice: Subject to any disclaimer, the term of this patent is extended or adjusted under 35 U.S.C. 154(b) by 349 days.

(21) Appl. No.: 12/520,832

(22) PCT Filed: Dec. 14, 2007

(86) PCT No.: PCT/EP2007/063923
§ 371 (c)(1),
(2), (4) Date: Dec. 14, 2009

(87) PCT Pub. No.: WO2008/077815
PCT Pub. Date: Jul. 3, 2008

(65) Prior Publication Data
US 2010/0108852 A1  May 6, 2010

(30) Foreign Application Priority Data

Dec. 22, 2006 (DE) .......... 10 2006 062 195

(51) Int. Cl.
*F16M 13/00* (2006.01)

(52) U.S. Cl. ........ 248/580; 248/542; 248/613; 267/172; 267/178

(58) Field of Classification Search ................... 267/172, 267/273, 178; 248/57–577, 580–581, 584–585, 248/594, 613, 611
See application file for complete search history.

(56) References Cited

U.S. PATENT DOCUMENTS

| 2,924,411 A | | 2/1960 | Rouverol |
| 4,613,119 A | * | 9/1986 | Hardtke ............... 267/172 |
| 4,862,742 A | * | 9/1989 | Pospischil et al. ........ 73/161 |
| 5,018,700 A | * | 5/1991 | Hardtke ............... 248/571 |
| 7,971,846 B2 | * | 7/2011 | Hardtke ............... 248/584 |
| 2009/0065675 A1 | | 3/2009 | Hardtke |

FOREIGN PATENT DOCUMENTS

| DE | 8806433 | 9/1989 |
| DE | 10104661 | 8/2002 |
| DE | 102005045736 | 4/2007 |
| FR | 2000305 | 9/1969 |
| FR | 2286330 | 4/1976 |
| GB | 1242140 | 8/1971 |

OTHER PUBLICATIONS

International Preliminary Report on Patentability dated Jun. 22, 2009 issued in related International Patent Application No. PCT/EP2007/063923.

* cited by examiner

*Primary Examiner* — Tan Le
(74) *Attorney, Agent, or Firm* — Grossman Tucker Perreault & Pfleger, PLLC (57) ABSTRACT

A constant bearer having a fastening part, a load-bearing part and a spring system which is arranged between the fastening part and the load-bearing part for generating a carrying force which remains constant over a carrying travel of the load-bearing part with respect to the fastening part, where the spring system has a suspension system for absorbing the load, a compensation device for compensating for changing spring forces of the suspension system over the carrying travel, and a prestressing device for setting a prestressing force of the suspension system.

27 Claims, 9 Drawing Sheets

CONSTANT BEARER

The invention relates to a constant bearer for loads which are displaced, in particular for pipelines and the like, having a fastening part, a load-bearing part and a spring system which is arranged between the fastening part and the load-bearing part for generating a carrying force which remains constant over a carrying travel of the load-bearing part with respect to the fastening part, where the spring system has a suspension system for absorbing the load, a compensation device for compensating for changing spring forces of the suspension system over the carrying travel, and a prestressing device for setting a prestressing force of the suspension system.

A constant bearer can, for example, be a constant hanger for suspending a load, or a constant bearer for supporting a load. Constant bearers of the kind mentioned in the opening paragraph are, for example, described in DE 10 2005 045 736 and PCT/DE2006/001678 or, as constant hangers, in DE 88 06 433 U1 and FR 22 86 330 A1. In this context, compensation devices are in each case provided in the form of auxiliary suspension systems and/or cam parts, via which any deviation of a main spring from a theoretically linear spring force/spring travel profile can be compensated for, e.g. by introducing additional forces by means of the auxiliary suspension system and/or the cam parts.

U.S. Pat. No. 2,924,411 A, for example, describes a constant bearer with a compensation device displaying a cam part designed as a cam disc, over the circumference of which a carrying cable with attached load runs over the carrying travel. The cam disc is connected in non-rotating fashion to a circular plate, on which a cable acts to transmit a tensile force generated by means of the suspension system. A certain adjusting position of the cam disc is envisaged, for which the cam disc is designed. If a prestress of the suspension system changes, the cam disc deviates from the adjusting position. By means of an adjusting device provided, the relative position of the cam disc and the circular disc can be changed by rotation in order to reach the adjusting position, this being complicated and inconvenient. However, this adjustment does not take into account the fact that, when the set prestress of the suspension system is changed, this simultaneously influences the overall spring characteristics of the suspension system. This is because, despite the setting of the compensation device, further deviations from the desired, constant carrying force/carrying travel profile occur, since the deviations from the theoretically linear spring force/spring travel profile when the prestress changes towards ranges of higher or lower forces differ from those in the range of the originally preset prestressing force, to which the contour of the cam disc is, however, necessarily adapted.

DE 101 04 661 A1 describes a constant bearer designed as a constant hanger that displays a main suspension system with a helical compression spring and an auxiliary suspension system with a leaf spring for compensating for deviations in the spring force of the main suspension system from the theoretically linear spring force/spring travel profile, where the prestresses of the main suspension system and the auxiliary suspension system can be set separately.

FR 2 000 305 A discloses a constant hanger designed as a lever arm bearer that displays a spring device with a helical compression spring and a lever arrangement with a power lever arm and a work lever arm, where the latter contributes to minimising a torque exerted on an attached load.

Thus, if a set prestress of the suspension system is changed, this simultaneously influences the overall spring characteristics of the suspension system. Despite the compensation device, this leads to deviations from the desired, constant carrying force/carrying travel profile, which may no longer comply with the demand for a maximum deviation of the carrying force of just a few percent in the carrying force/carrying travel profile. This can in turn require, for example, that a cam part of different geometry and/or a modified auxiliary suspension system be installed in the constant bearer. This is a complicated procedure, calls for a trained mechanic, and can usually hardly be done on-site.

The object of the invention is to provide a constant bearer of the kind mentioned in the opening paragraph with a possibility for correcting the compensation device, by means of which, in the event of a change in the prestress towards ranges of higher or lower forces, the deviations from the theoretically linear spring force/spring travel profile occurring over the carrying travel as a result of this changed prestress, and equally the deviations from the theoretically linear spring force/spring travel profile occurring over the carrying travel in the range of the originally preset prestressing force, can be compensated for without necessitating the replacement of components. Moreover, these corrections are to be easy and uncomplicated to perform.

According to the invention, this object is solved by the features of the characterising portion of claim 1. The correction device thus makes it possible to correct deviations in the desired, constant carrying force/carrying travel profile resulting from a changed prestressing spring force, without having to replace a component of the compensation device, for example, such that the prestress of a constant bearer envisaged for use can be set on-site to cater to actual load conditions that deviate from the expected and/or calculated conditions.

The correction device is preferably integrated in the constant bearer. The correction device can be located within the housing. This makes it possible to retain the targeted, compact design. The correction device can be designed in such a way that it acts directly on the suspension system. To this end, provision can be made, for example, for the activation of correction spring elements, although this would make the correction device complicated. Therefore, provision is preferably made for the correction device to directly act on or affect the suspension system in the form of a change in the spring arrangement. This change preferably relates to the spatial orientation of one or more springs of the suspension system, as a result of which the profile of the spring forces to be transmitted, or of the carrying force over the carrying travel, can be corrected in accordance with the changed prestress.

Provision can advantageously be made for the correction device to be coupled to the prestressing device, preferably directly. This means that setting of the prestress and correction via the correction device can be performed in one step. The correction is preferably made automatically in the event of change in the prestressing force, preferably via the correction device.

In a development of the constant bearer, the compensation device can display a cam part coupled to the load-bearing part. The suspension system can encompass at least one spring, particularly a compression spring, that has a force side supported on a force point on the fastening part, and a load side acting on a load point on the cam part to transmit force from the suspension system to the load-bearing part. To correct deviations in the carrying force over the carrying travel resulting from a changed prestressing spring force, the load point and/or the force point can, according to the invention, be designed to be movable relative to the cam part and over an adjusting travel with a directional component perpendicular to the spring axis of the respective spring and in a plane corresponding or parallel to the carrying force. In this context, the movability preferably relates to the cam part and/or the fastening part. The load point and/or the force point can expediently be designed to be fixable in a particular correction position. This can be accomplished, for example, by jamming or fastening the respective point, or by supporting the respective point. Correction can be performed on one or more springs of the auxiliary suspension system and/or the main suspension system.

The spring is preferably designed as a compression spring. Pre-setting of the prestress can, as described in more detail below and in DE 10 2005 045 736 and PCT/DE2006/001678, be performed via axial compression or relaxation of the spring from one of its ends. Therefore, the content of publications DE 10 2005 045 736 and PCT/DE2006/001678 relating to presetting of the prestress is incorporated into the disclosure of the present application here. As mentioned above, increasing or decreasing the spring length simultaneously changes the spring characteristics over the carrying force/carrying travel profile. According to the invention, displacement of the load point perpendicularly to the spring axis is additionally envisaged for correction purposes, in consequence of which the force geometries resulting in the carrying force can be changed in such a way that, despite the changed prestressing force, constancy of the carrying force over the carrying travel can be guaranteed within a small tolerance range of just a few percent.

As likewise described in DE 10 2005 045 736 and PCT/DE2006/001678, or in EP 0 306 786 A1, the load point can, e.g. by means of a rolling bearing or sliding bearing, be movable relative to the cam part over the carrying travel, via a cam side face of the cam part, and/or mounted in a bearing in swivelling fashion relative to the cam part. Due to the correction device according to the invention, displacement of the position of the load point can be performed that is superimposed on its movement relative to the cam part at every point. The load point can thus be set in leading or trailing fashion relative to its originally set position.

The correction device preferably displays a guide for the load point and/or the force point of one or more springs. In this context, provision can be made, for the purpose of adjustment in the guide, for the load point and/or the force point to be displaceable on a guide travel with at least one directional component perpendicular to the longitudinal axis of the spring and in the same plane as the carrying force. The load point and/or the force point can preferably be displaceable in and opposite to the direction of the carrying force. This in itself makes it possible to change the prestress of the corresponding spring. Provision can additionally be made for displacement with a directional component in the longitudinal axis of the spring, this permitting a further change in the prestress of the spring. The load point and/or force point can expediently be fixable in non-positive and/or positive fashion in a desired correction position in the guide relative to the cam part. As a result, the correction device can correct the deviation of the carrying force over the carrying travel resulting from a change in the load by changing the magnitude and/or direction of the inclination of the spring, and thus of a force transmitted from the spring to the cam part or the compensation device.

Instead of a single spring, it is also possible to provide several springs that act on a common load point and thus as a combined spring in relation to the load point. In relation to the load point, the individual spring forces can thus vectorially add up to a combined spring force, such that the dimensions of the constant bearer can be kept small if higher combined spring forces are required. In this context, the individual spring axes of the springs are preferably arranged parallel to each other. The springs can also be arranged coaxially to each other. Individual or all springs arranged parallel to each other can additionally each display one or more coaxially arranged springs. For example, two springs arranged coaxially to each other and/or two springs arranged next to each other can be provided for this purpose.

The suspension system can preferably display two springs, particularly two compression springs. The compression springs can be arranged opposite each other, symmetrically to the carrying force. In this context, the spring axes of the springs or compression springs can, in a starting position, be inclined relative to each other and include an angle of less than or greater than 180°. In the starting position, the springs can be arranged to converge on each other with a directional component opposite to or in the direction of the carrying force. The springs are preferably located on a common spring axis in the starting position. To this end, the load side of the compression springs can in each case act on a load point assigned to them on the cam part or on a cam part respectively assigned to them. As a result, as described in more detail in DE 10 2005 045 736 and PCT/DE2006/001678, to which express reference is made at this point, a symmetrical system of forces is proposed that makes it possible for relatively great forces to be transmitted to the cam part, a certain portion of which acts in the direction of the carrying force. As a result of the symmetrical spring arrangement, the entire structure of the constant bearer can also be mirror-symmetrical, with a plane of mirror symmetry perpendicular to a plane extending in the direction of the carrying force and parallel to the spring axes. The starting position can thus correspond to the position in which the cam part can be "adapted" to a specific prestress at the factory. In this context, provision can be made for the correction device only to intervene correctively with a changed prestress when the load point shifts relative to the cam part, as described in more detail below.

As mentioned above, an auxiliary suspension system can be provided for suspension purposes to compensate for the spring error in the presence of a changing spring load. In this context, the auxiliary suspension system and the suspension system, generally referred to as the main suspension system in the prior art, can be arranged horizontally and parallel to each other. One pair of compression springs can be provided for each suspension system.

In a starting position, the two compression springs of a pair of compression springs are preferably located on one spring axis, where the compensation device, i.e. the assigned cam parts or cam levers, is positioned between the compression springs. In their starting position, the compression springs can thus act against each other on the cam part or the cam parts. The cam part preferably displays an associated cam side face for each compression spring, where said faces can be located on a common cam part or each on an assigned cam part, particularly a cam lever. Particularly in reference to the cam lever, PCT/DE2006/001678 describes the force symmetries in more detail, where its content is expressly incorporated into the disclosure of this application, especially in reference to the spring arrangement and the transmission of forces from the cam part to the load-bearing part and the arrangement and design of the cam parts designed as cam levers.

DE 10 2005 045 736 A1 describes another spring arrangement, in which an auxiliary suspension system, parallel to a main suspension system, is provided that acts on the load-bearing part via cam parts. In this case, the load point and/or the force point of one or more auxiliary springs and/or main springs can be located in the guide in sliding fashion.

In a preferred embodiment, the cam part can display at least one lever, designed as a cam lever and mounted in a swivelling link on the fastening part, with two side faces lying opposite each other in its longitudinal extension, a first side face and a second side face. The load side of the spring is preferably mounted, preferably in swivelling fashion, in an area of the first side face facing towards it, or on the first side face facing towards it, or is preferably supported on it. The second side face can be designed as a cam side face, on which the load-bearing part rests in sliding or rolling fashion. Thus, a power arm can be formed over a distance between the swivelling link or swivelling axis of the cam lever on the fastening part and the preferably swivelling mount of the spring on the first side face. Correspondingly, a work arm can be formed over a distance between the swivelling link or swivelling axis of the cam lever and a load point or area in which the load-bearing part rests on the cam lever in sliding or rolling fashion. A correction, and simultaneously also a change of the prestress of the spring in question, can be performed by changing the direction and/or length of the work arm and/or the power arm, advantageously in the starting position. The orientation of the power arm relative to the load-bearing part and/or its arm length can be variable by changing the position of the load point in the guide.

The load-bearing part can display a load roller with an axis of rotation perpendicular to the spring axis and perpendicular to the carrying force direction. Provision is preferably made for the cam side face to rest on the load roller in rolling fashion in a plane perpendicular to the axis of rotation. As a result, the work arm can be varied via the rolling movement. The spring error over the spring travel can be compensated for via the profile of the cam side face. If there are several springs, each acting individually on the cam part, a cam lever with a cam side face can be assigned to each spring. In this context, the load-bearing part can in each case act via a load roller on the cam side face of the cam lever assigned to it. The load rollers can, in turn, be located on a common axis of rotation, designed as a load roller axle and mounted on the fastening part. Bushes pushed onto the load roller axle allow the load rollers to be separated from each other and from the housing. The load-bearing part can furthermore display load-bearing plates with a guide slit limiting the carrying travel, through which the load roller axle passes. In relation to the design of the cam part and the cam levers, the load-bearing part and the arrangement of the load rollers, reference is again made to PCT/DE2006/001678, its content being incorporated here.

Moreover, a point or area of the cam side faces can rest on the load-bearing part, said point or area moving as the load-bearing part moves over the carrying travel and pointing in the direction of the carrying force with a magnitude that changes over the carrying travel. As a result, the spring force introduced can be oriented or deflected in such a way that a force component can at all times be transmitted to the load-bearing part in the direction of the carrying force, meaning that a necessary carrying force is generated at all times.

In a preferred development of the constant bearer, the cam part can be designed in flat form with a larger side face. Furthermore, the cam part can be mounted on the fastening part of the constant bearer in a swivelling bearing permitting swivelling movement about a swivelling axis perpendicular to its larger side face, as well as perpendicular to the longitudinal axis of the spring and to the carrying travel. The guide is preferably integrated in the cam part at a distance from the swivelling bearing. A simple design is proposed in this way, since integration of the guide in the cam part means that no new components are necessary for retaining the guide.

The guide preferably displays a slot or slit for accommodating and guiding the load point. This embodiment is particularly easy to integrate in a flat cam part. In this context, the slot can, like the cam side faces, display a curved profile that can result from, among other things, a change in the spring forces over the carrying force/carrying travel profile and a suspension system characteristic that is changed or shifted by a changed prestress.

The longitudinal extension of the slot is preferably of linear design, such that the load point can be guided in linear fashion in the guide. To this end, the longitudinal extension of the slot and the power arm can include a correction angle that is preferably greater than 0°. The orientation of the slot can be adjustable via a corresponding device. To this end, the section of the cam part with the slot can, for example, be designed to be rotatable about an axis perpendicular to the longitudinal extension of the slot and fixable in the cam part in a particular rotational position, e.g. by means of a clamping device provided. The slot is, however, preferably permanently integrated in the cam part.

The ideal or optimum correction angle in practice is dependent, among other things, on the geometries of the compensation device and the characteristics of the suspension system, as well as on the preset prestress of the suspension system in the starting position.

For easier displacement of the load point in the guide, the force side of the spring can be mounted on the fastening part in swivelling fashion. This permits swivelling of the spring when the load point is displaced. This swivelling movement can, however, be relatively small. The springs used are preferably helical springs and, particularly if the constant bearer is envisaged for use as a constant hanger, helical compression springs. To reduce the manufacturing effort, provision can alternatively be made for the force side of the springs not to be mounted on the fastening part via a swivelling link, and for compensation in the event of displacement of the load point relative to the fastening part in the guide to be achieved by elastic deformation and/or inclination of the spring.

In the starting position, the load point of the spring can expediently be located in the middle of the slot in relation to the longitudinal extension of the slot. As a result, the preset prestress can be reduced or increased within a certain range that depends, among other things, on the length of the slot.

As mentioned, the load point can be fixable in a particular correction position in the guide or the slot. Preferably or additionally, provision can be made for the load point to be supported on the cam part in the guide by means of a retaining device. For example, a mechanically operated or motor-driven linear actuator can be used that is capable of displacing the load point in the guide and blocking its displacement in a particular position.

Two cam levers with slots for guiding the load points of the springs can preferably be provided for each spring. The two cam levers can be located a distance apart on the fastening part, parallel to each other and in alignment with the carrying force, as well as perpendicularly or roughly perpendicularly to the spring axis and in swivelling fashion on a common swivel pin. To this end, as described in PCT/DE2006/001678 and referred to, spacing elements can be provided on the swivel pin, preferably in the form of bushes fitted on the swivel pin, which can be located between the cam levers and separate them.

The load point of the respective spring can expediently be supported in the middle of a first transverse element in the form of a transverse block, a transverse strut or preferably in the form of a transverse bolt, a guide end of which is in each case mounted in sliding and preferably non-rotating fashion in one of the guides in the cam levers. To this end, the guide end can be laterally flattened from two opposite sides, in each case forming a shoulder and two parallel guide side faces. As a result, the guide end can rest in non-rotating and sliding fashion against the inner side faces of the guide assigned to it. The guide end preferably reaches through the slot and projects slightly beyond the side face in which the slot is made. To limit the guide travel, stops can be provided that are preferably movable over the longitudinal axis of the slots. The guide ends preferably run up against the end side of the slots. The face end of at least one guide end of the transverse bolt is preferably provided with a marking that preferably indicates a geometrical centre of the face end in relation to a longitudinal axis of the slot. The marking can, for example, be of a colour contrasting with the surrounding structure. The marking can preferably display a notch or groove, where the notch or groove expediently runs perpendicularly to the guide side faces. The notch or groove can have a round or curved cross-section. The cross-section is preferably designed in such a way that it forms a symmetrical centre line. A V-shaped cross-section is preferred. A scale for indicating the guide travel of the guide end in the slot can be provided at the side, adjacent to the slot. The scale is preferably designed as a load scale and marked in a unit of force, preferably in kilonewtons (kN) and/or pounds (lbs). To give a view through to the slot and/or the scale, a housing window can be provided in a housing of the constant bearer at the height of at least one slot.

To support the transverse bolt, a second transverse element, located between the cam levers, can be provided in the form of a transverse bolt, a transverse strut or the like, preferably in the form of a transverse block. The transverse block can expediently be arranged parallel to the transverse bolt, and a distance from it in the longitudinal axis of the slot, and connected to the cam levers at one end. The transverse bolt can be connected to the transverse block via a spindle mounted in rotating fashion in the middle of the transverse block, in that said spindle passes through a first through-hole with an internal thread that is engaged by the spindle. By turning the spindle, the transverse bolt, the guide ends of which are mounted in the slots in non-rotating fashion, can thus be displaced in the longitudinal direction of the slots. Apart from its flattened guide ends, the transverse bolt preferably displays a circular cross-section.

The transverse block can expediently display an essentially rectangular cross-section, where the spindle reaches through the transverse block, preferably from a side face facing towards the transverse bolt, through a second through-hole in which it is mounted in freely rotating fashion, i.e. without engaging threads. Via a blocking element, preferably via a screw nut that has a locknut and rests against the side face, the spindle, and thus the transverse bolt, can be supported with the load end of the spring on the transverse block and thus on the cam parts or cam levers. The transverse block is preferably connected to the cam parts via a push-in connection, preferably loosely. The retaining device is easy to assemble and dismantle as a result.

The transverse block can expediently be located underneath the transverse bolt in installed position, an adjusting end of the spindle reaching through the transverse block and being provided with a screw head of preferably customary design for turning the spindle. Consequently, in installed position on a constant bearer designed as a constant hanger, the correction device or the spindle can easily be operated from below by means of a customary tool, such as a socket wrench or an Allen key.

The prestressing device can display an adjusting device for presetting the prestressing force. This can be designed like, or similarly to, that described in DE 10 2005 045 736 and PCT/DE2006/001678, to which reference is expressly made here. Thanks to the correction device according to the invention, the presetting of the prestressing force, adapted to the envisaged second cam side face, can, for example, be set at the factory and sealed or blocked in such a way that the presetting cannot be changed unintentionally.

As described in more detail in DE 10 2005 045 736 and PCT/DE2006/001678, the spring can to this end be located in a fastening abutment on the fastening side and/or in a load abutment on the load side, where the fastening abutment and/or the load abutment can be displaceable in the direction of the spring axis and lockable. For reliable supporting of the spring, the abutments can in each case display an abutment disc, on which the face end of the respective spring is supported and which can be adjusted by displacement in the direction of the spring axis via a screw device. In particular, the fastening abutment can display a side wall of the housing, designed as a tensioning wall, on which the fastening side of the spring is supported and which can be adjusted for presetting the prestress by displacement in the direction of the spring axis and fixed via a screw device.

The present invention is described in more detail below on the basis of a practical example illustrated in a drawing. The Figures show the following.

FIGS. 1-8 show a constant bearer 1 and components of constant bearer 1 in various views, where, in the example shown here, constant bearer 1 is designed for a load to be suspended (not shown here) and thus acts as a constant hanger.

Constant bearer 1 for the load that is displaced, particularly for a pipeline (not shown here) and the like, has a fastening part 2, a load-bearing part 3 and a spring system 4, located between fastening part 2 and load-bearing part 3, for generating a carrying force T which remains constant over a carrying travel $t_w$ of load-bearing part 3 with respect to fastening part 2. Spring system 4 comprises a suspension system 5 which absorbs the load, a compensation device 6 for compensating for changing spring forces of suspension system 5 over carrying travel $t_w$ and a prestressing device 7 for setting a prestressing spring force V of suspension system 5. Owing to the design of constant bearer 1 as a constant hanger, fastening part 2 is designed to be at the top in installed position and load-bearing part 3 to extend downwards in installed position. All force vectors entered in the Figures must be interpreted qualitatively and are not intended to indicate accurate magnitudes.

Fastening part 2 displays a housing 8 with plate-like side walls 9, of which the front side wall is in each case omitted in FIGS. 1, 2, 3a-c and 7a-c, as are also the lid-like top left side walls in FIGS. 1, 2, 7a and 7b. The two larger side walls, i.e. front side wall and rear side wall 9, are connected to an upper connecting strap 10, which displays a fastening hole 11 for connection to, and suspension from, a base not shown here. Housing 8 surrounds spring system 4 and load-bearing part 3 laterally and on the top side, where load-bearing part 3 can be displaced downwards, through an orifice 12 and out of housing 8, over carrying travel $t_w$ in a travel direction v in the direction of a load force L, and displaced back again in the direction opposite to travel direction v in the direction of carrying force T.

According to the invention, a correction device 13 is provided for correcting deviations in carrying force T over carrying travel $t_w$ resulting from a changed prestressing spring force V. In this context, correction device 13 is, as described in more detail below, simultaneously provided with a prestressing function for suspension system 5. Correction device 13 is coupled to a part of prestressing device 7, in order to be able to perform, automatically and in one step, correction via correction device 13 at the same time as a change in a presetting of the prestressing spring force made at the factory, for example.

Suspension system 5 comprises two springs 14, which are arranged horizontally in installed position and designed as compression springs, each of which has a force side supported on housing 8 and a load side supported on a load point 15 on compensation device 6. For each spring 14, compensation device 6 displays two cam levers 16, which are located a distance apart on housing 8, parallel to each other and perpendicularly in alignment with carrying force T, as well as on a common swivel pin 17 in a manner permitting free swivelling about a swivelling axis s. Swivelling axis s is perpendicular to front and rear side walls 9 of housing 8. Bushes 22 fitted on swivel pin 17 separate cam levers 16 from each other and from side walls 9.

Figure 7A:
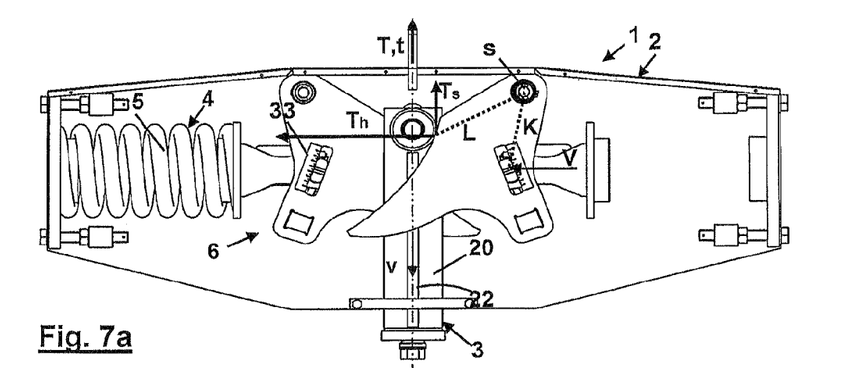
Figure 7B:
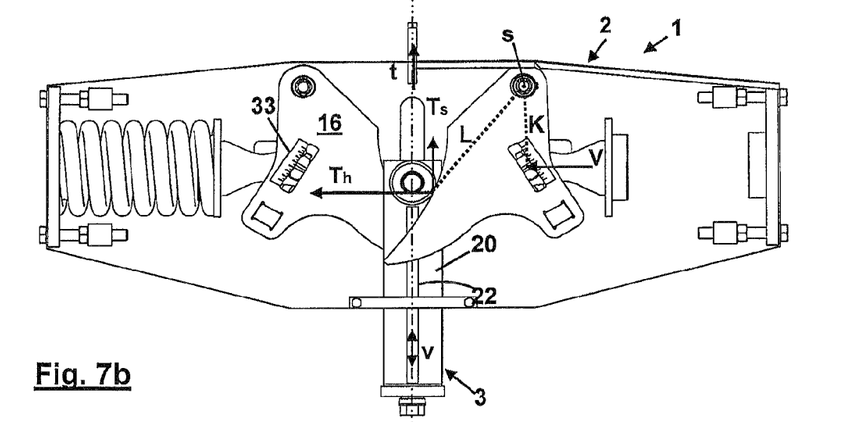
Figure 7C:
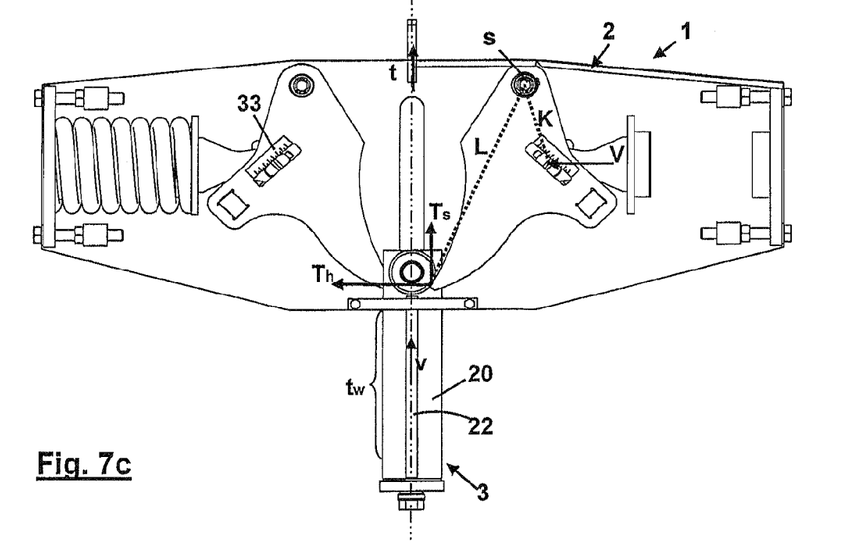

At a distance from swivelling axis s, springs 14 act with their respective load points 15 on the assigned cam levers 16, forming a power arm K. Cam levers 16 are each provided with a cam side face 18, which displays a specific, curved profile to compensate for changing spring forces over carrying travel $t_w$. Load-bearing part 3 displays load rollers 19, which are mounted in a manner permitting rotation about a common axis of rotation d, perpendicular to spring axis f and perpendicular to carrying force direction t. Load-bearing part 3 rests on cam side faces 18 in rolling fashion via load rollers 19. Load rollers 19 each rest on the respectively assigned cam side face 18 at a rolling point 24, where rolling point 24 is a distance from axis of rotation d at every point of cam side face 18. This results in formation of a work arm L between rolling point 24 and swivelling axis s, which is variable by load roller 19 rolling over cam side face 18. This is shown in FIGS. 7a to 7c. It is noticeable that, as can be seen on front cam lever 16 in FIG. 1, cam side faces 18 necessarily point in carrying force direction t with a directional component at all times over their entire non-linear, curved and steady profile, in order to generate carrying force T in carrying force direction t for the load. As carrying force T is supposed to be in equilibrium with load force $L_k$ during operation, load-bearing part 3 is blocked once suspension system 5 has been set to a particular prestress at the factory.

Cam levers 16 assigned to spring 14 on the right in the Figures laterally reach around two load-bearing plates 20, which are attached to axis of rotation d and pass parallel downwards through orifice 12 for connection to a further load-bearing element 21 for attaching the load not shown here. Cam levers 16 assigned to spring 14 on the left here are arranged to pass through the gap between load-bearing plates 20. In the starting position shown in FIGS. 1, 2, 3a and 7a-c, the two springs 14 are located on a common, horizontal spring axis f. Constant bearer 1 thus displays a mirror-symmetrical force profile and a largely mirror-symmetrical arrangement of the components in relation to a plane of mirror symmetry located perpendicularly to rear side wall 9 of housing 8 or perpendicularly to a plane extending in the carrying force direction and lying parallel to the spring axes.

Correction device 13 is located in housing 8. Provided in each case in this context, as part of correction device 13 according to the invention, is a guide 25 in the form of a slot 26, which is in each case integrated in cam levers 16. A load point 15 of spring 14 is in each case guided in slot 26 in sliding fashion over a guide travel $f_w$, where guide travel $f_w$ is limited by load point 15 running up against the end side of slot 26 in the direction of longitudinal axis l. The guide travel $f_w$ indicated in the drawing refers to a geometrical centre of load point 15 in longitudinal axis l of slot 26. Slot 26 is arranged with its longitudinal axis l inclined to carrying force direction t and with a directional component in the direction of spring axis f. In this context, a gap between load point 15 and swivelling axis s in each case forms a power arm K, which can be varied by displacing load point 15 in guide 25 or in slot 26 over guide travel $f_w$. As explained in more detail on the basis of FIGS. 3a-c, the deviation from the desired, constant profile of carrying force T over carrying travel $t_w$, occurring when the prestress changes, is corrected by changing power arm K in terms of its length and its direction relative to the cam lever assigned to it. This correction can be used, for example, to cover changed friction losses of the moving parts, and particularly of the parts sliding or rolling relative to each other.

Figure 2:
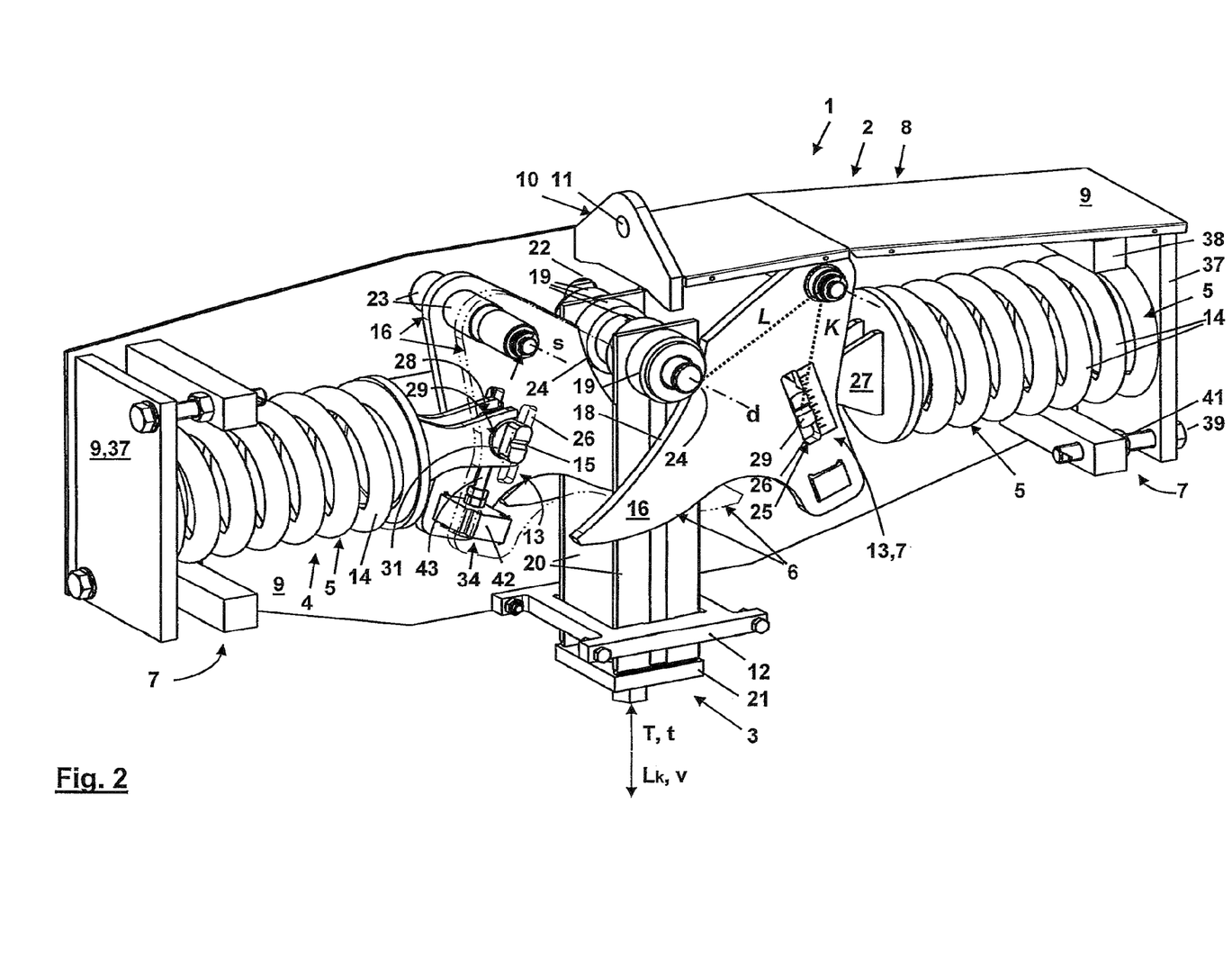

To illustrate the arrangement of load point 15 of spring 14 in slot 26, front left-hand cam lever 16 is omitted in FIG. 2, or indicated in the form of a transparent phantom image drawn in broken lines. In this context, the load side of springs 14 is in each case supported on a plate-like load abutment 27, which is in turn supported on a transverse bolt 28 in swivelling fashion. The two ends of transverse bolt 28, which are designed as guide ends 29, are mounted in slots 26 in sliding fashion. Guide ends 29 are each laterally flattened from two sides, in each case forming a shoulder 30 and two parallel guide side faces 31. As a result, guide side faces 31 of guide end 29 rest in non-rotating and sliding fashion against the inner side faces of the associated slot 26. As the spring forces are transmitted to compensation device 6 or assigned cam levers 16 at this point, the two guide ends 29 of a transverse bolt 28 form the load point 15 of the associated spring 14.

Provided at the face end on guide end 29 is a marking 32 in the form of a notch with a V-shaped cross-section, which runs perpendicularly to guide side faces 31 or perpendicularly to longitudinal axis l and indicates a face-end centre in reference to longitudinal axis l of slot 26. Located at the side along slot 26 is a load scale 33 for indicating the guide travel $f_w$ of guide end 29 in slot 26, where load scale 33 is marked in kilonewtons (kN) and in pounds (lbs). Transverse bolt 28 is held in a particular correction position in slot 26, and displaced over guide travel $f_w$, by means of a retaining device 34, described in more detail below on the basis of FIGS. 5 and 6.

Figure 3A:
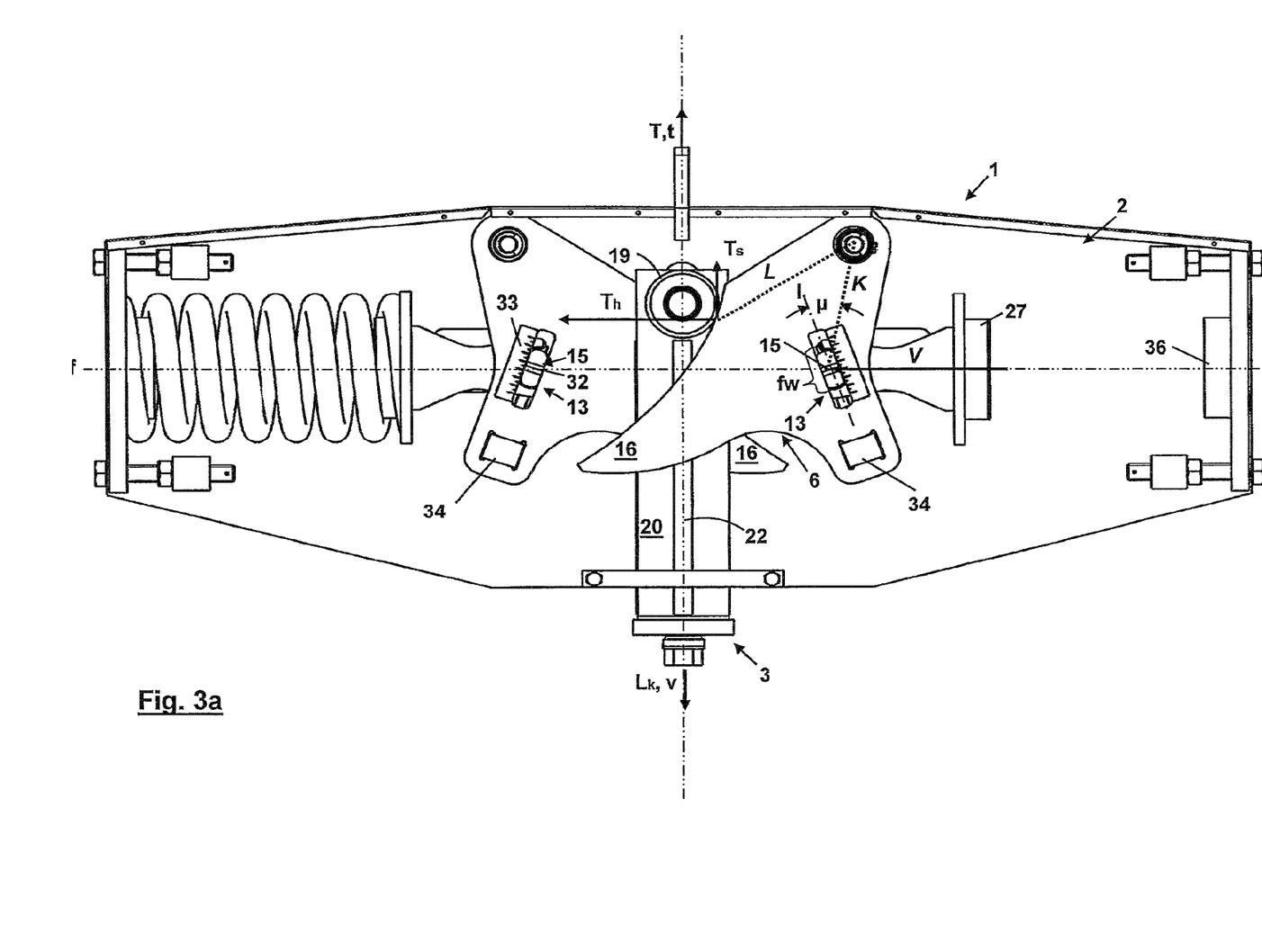
Figure 3B:
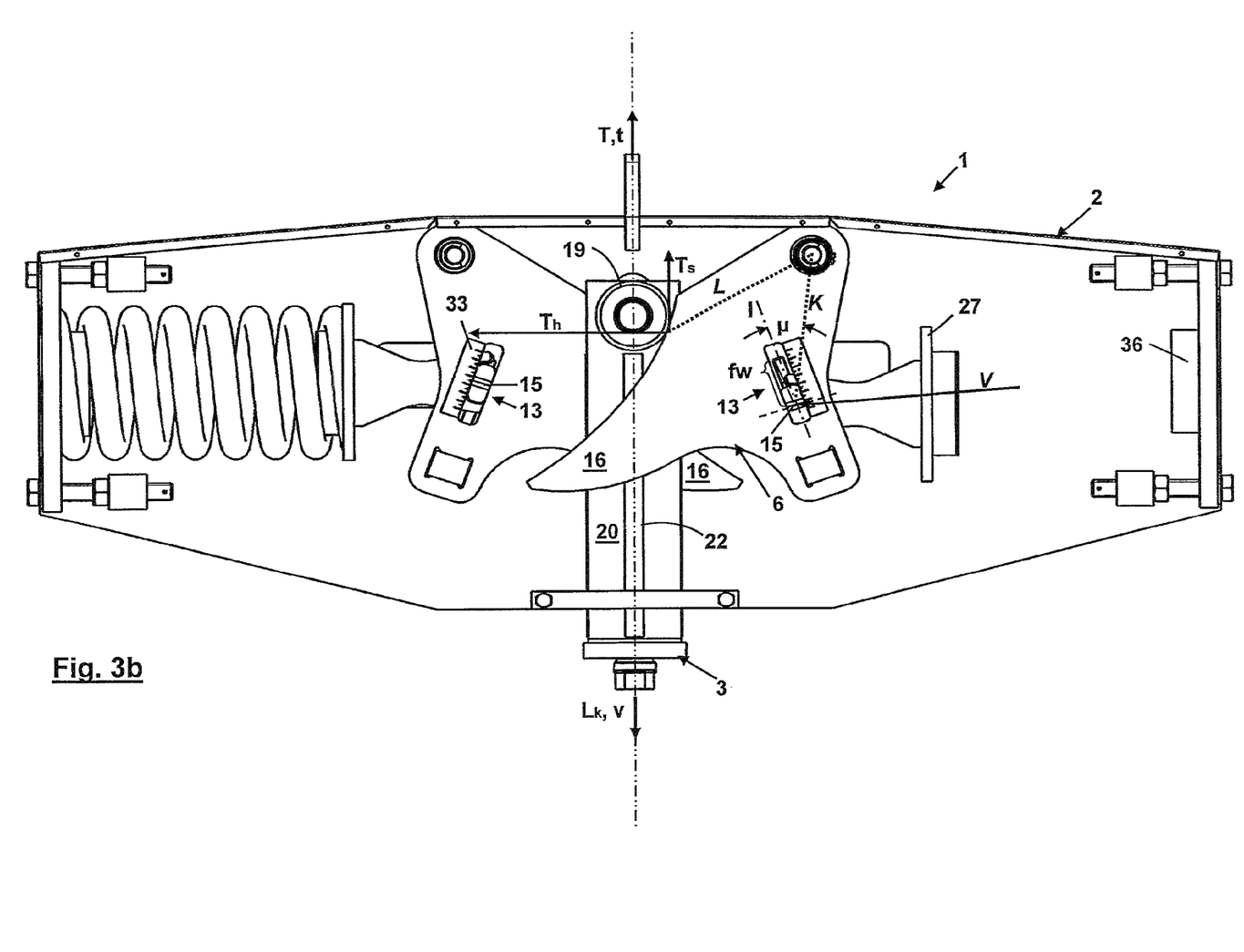
Figure 3C:
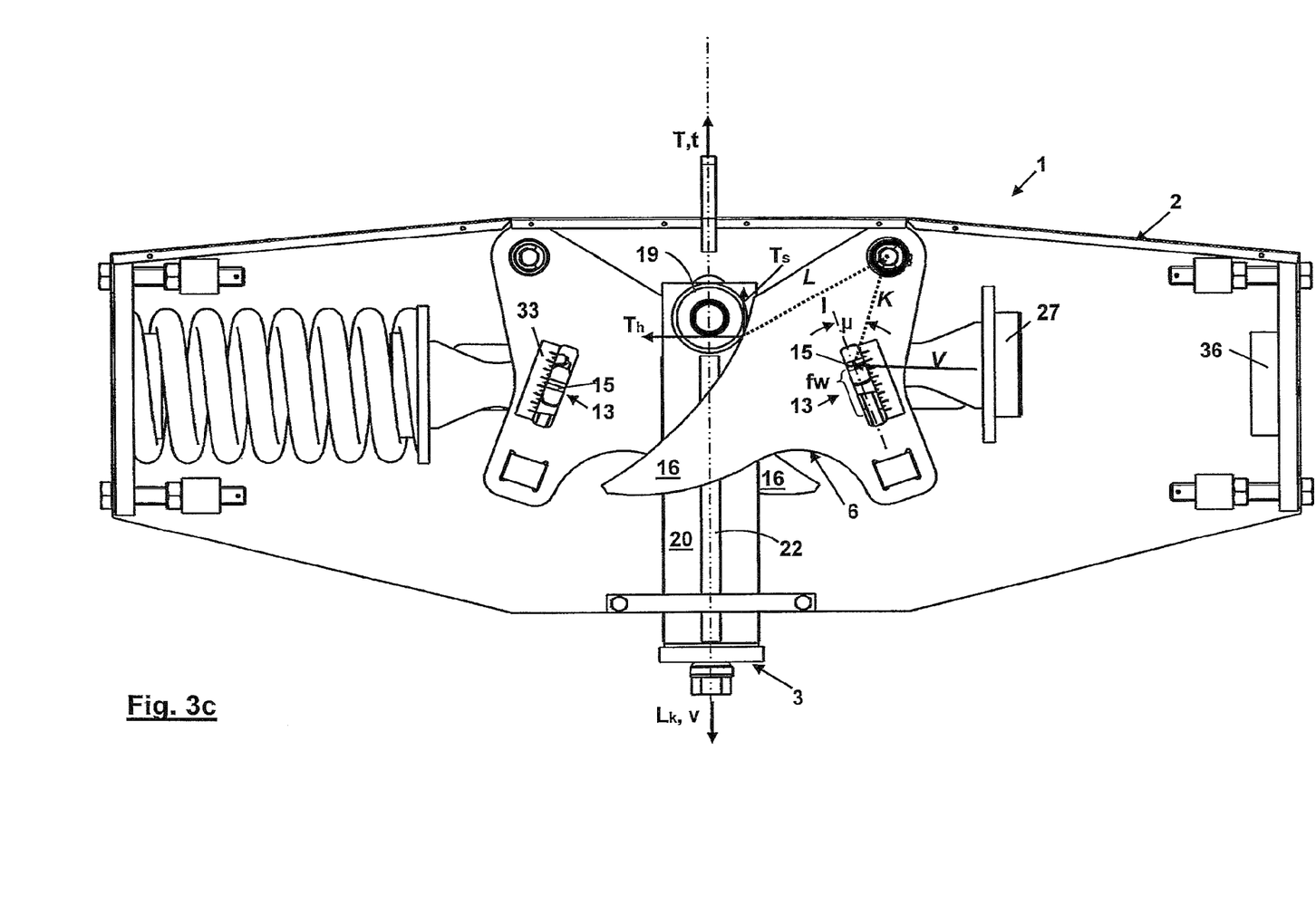

The underlying principle of correction device 13 is explained in more detail on the basis of FIGS. 3a to 3c. The right-hand spring is omitted in each of these Figures. Moreover, the position of load point 15 of left-hand spring 14 remains unchanged in the starting position, in order to illustrate the movement of load point 15 of the omitted right-hand spring resulting from a changed presetting of the prestress. This would hardly be done in practice, since the aim is to maintain symmetrical forces at all times, and an identical prestress would be set on both springs. Cam levers 16 themselves remain in an unchanged position in FIGS. 3a to 3c, meaning that the respective distance between swivelling axis s and rolling point 24, and thus the respective work arm L, remains identical and unchanged in all cam levers 16.

The two load points 15 of springs 14 are in the starting position in FIG. 3a, whereas right-hand load point 15 of right-hand spring 14 in the Figures is displaced downwards on carrying travel $f_w$ in FIG. 3b and upwards on carrying travel $f_w$ in FIG. 3c, up to the end of slot 26 in each case. Downward displacement of right-hand load point 15 shortens the distance between load point 15 and a fastening abutment 36, in which the spring omitted here is mounted on the fastening side, the spring being compressed accordingly, i.e. further prestressed. At the same time, power arm K is extended and its orientation changed. Similarly, when right-hand load point 15 is displaced upwards, the distance between load point 15 and fastening abutment 36 is increased, as a result of which the spring is correspondingly relaxed and power arm K shortened, its orientation being changed in the process. Thus, the prestress of the spring can be set by displacing load point 15 in slot 26. Moreover, upward or downward displacement of load point 15 simultaneously results in the direction of spring axis f, which is roughly horizontal in the starting position, being correspondingly inclined upwards or downwards. Thus, when load point 15 is displaced upwards, this being equivalent to relaxing the spring, the ratio of the force component in carrying force direction t to the force component perpendicular to carrying force direction t is increased. This caters to the circumstance that a spring with less prestress has a lower spring power. Similarly, when load point 15 is displaced downwards, this being equivalent to further prestressing spring 14, the ratio of the force component in carrying force direction t to the force component perpendicular to carrying force direction t is reduced. This caters to the circumstance that a spring with more prestress has a higher spring power. Thus, the direction and magnitude of power arm K are changed in both cases, whereas work arm L remains unchanged as long as the load-bearing part remains unmoved in the position shown in FIGS. 3a to 3c. Thus, correction of deviations in carrying force T over carrying travel $t_w$, or of the load-bearing behaviour, resulting from a change in prestressing spring force V is accomplished by correction of the length of the power arm and its orientation relative to cam lever 16.

Force components $T_s$ in carrying force direction t and $T_h$ in the horizontal direction are indicated qualitatively at rolling point 24. Also indicated qualitatively is prestressing spring force V, which changes in accordance with the displacement of load point 15 in slot 26. In this context, force component $T_s$ changes proportionally to changing prestressing spring force V, where the direction of prestressing spring force V is also changed as a result of spring 14 being displaced from its horizontal position in the starting position. Because of the prevailing symmetry of forces and the use of four cam levers 16, the individual force component $T_s$ on a load roller 19 is one-quarter of the total carrying force T, disregarding other influences, such as changed friction on moving parts.

Figure 4:
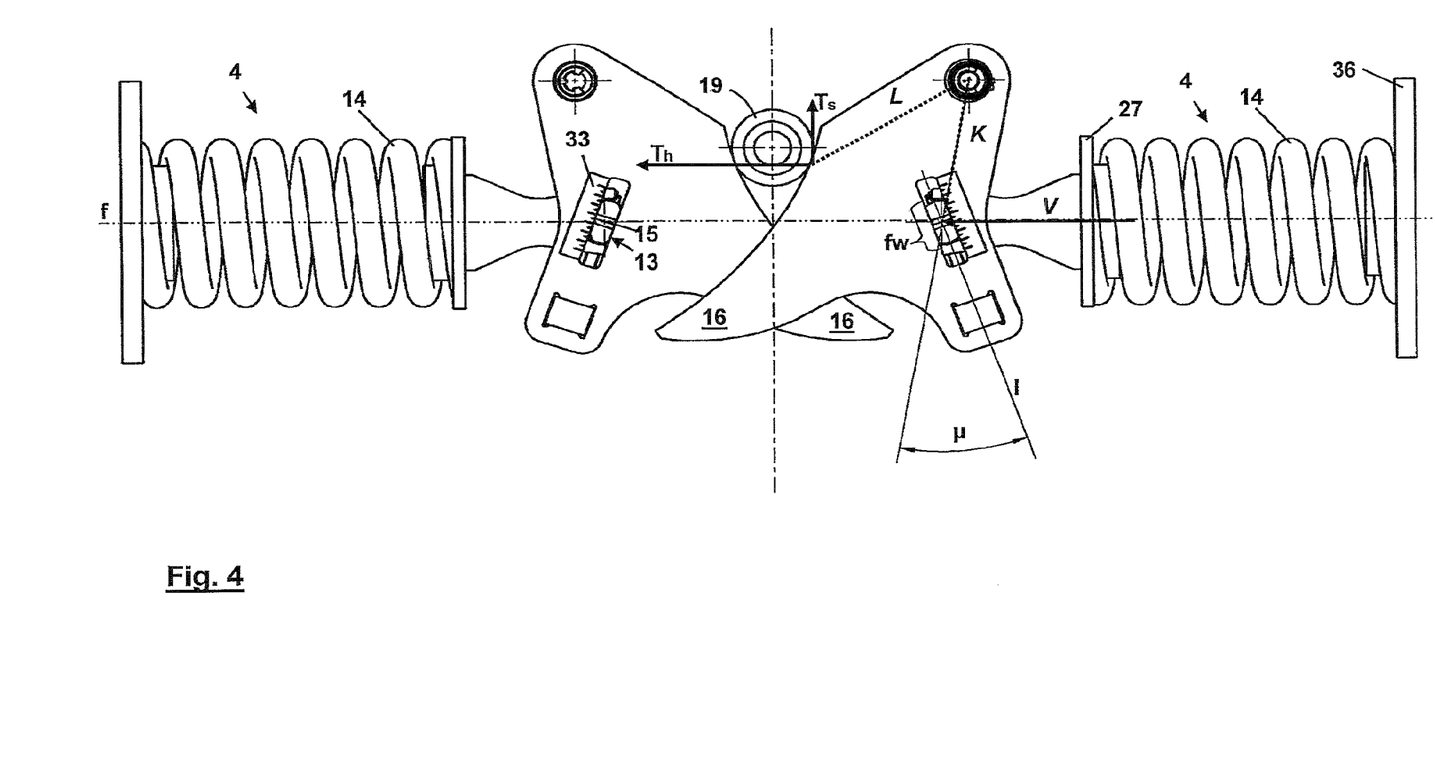

Decisive for the measure of the change in the ratio of force component $T_s$ in carrying force direction t to force component $T_h$ perpendicular to carrying force direction t is, among other things, the inclination of longitudinal axis l of slot 26. This inclination is shown in FIGS. 3a to 3c and in FIG. 4, where, for greater clarity, FIG. 4 shows only a side view of spring system 4 and load rollers 19. The inclination is described here by a correction angle μ, which is included by power arm K and longitudinal axis l of slot 26. Given the geometries used in this practical example, and on condition that guide 25 is linear, the optimum correction angle μ is roughly 30°. Other geometries may require a different optimum correction angle.

Prestressing device 7 furthermore displays an adjusting device 35 for presetting the prestressing force. It is in principle similar to the adjusting device disclosed in DE 10 2005 045 736 and PCT/DE2006/001678, but adjusting device 35 is of less complicated design thanks to correction device 13 according to the invention. Again, spring 14 is in each case mounted on the fastening side in a fastening abutment 36, which can be displaced in the direction of spring axis f and fixed in place. To this end, side wall 9 of housing 8, designed as a tensioning wall 37 on which spring 14 is supported on the fastening side, can be displaced in the direction of spring axis f and relative to front or rear side wall 9 and fixed in a particular prestressing position. For each spring 14, adjusting device 35 displays two transverse struts 38 with a rectangular cross-section, which are arranged perpendicularly to spring axis f and anchored at the face end in front and rear side walls 9. Two tensioning screws 39, located diagonally in tensioning wall 37, lead from the tensioning wall to transverse struts 38 and each pass through a through-hole 40 with an internal thread that is in each case engaged by tensioning screws 39. Turning tensioning screws 39 thus displaces tensioning wall 37 and changes the prestress of springs 14. A locknut 41 is provided on tensioning screws 39 and positioned against transverse struts 38 for locking in a particular prestressing position. The setting of the prestress by means of tensioning wall 37 remains identical in all the Figures shown. In the practical example presented here, provision is made for the prestress of springs 14 to be preset via adjusting device 35 at the factory or in the workshop and subsequently fixed, and possibly sealed, in the determined prestressing position. In this context, load point 15 is in the starting position, in which load point 15 is retained in the middle of slot 26. Once constant bearer 1 is at the envisaged installation site, it can be adapted to the load actually present by means of correction device 13.

Figure 5:
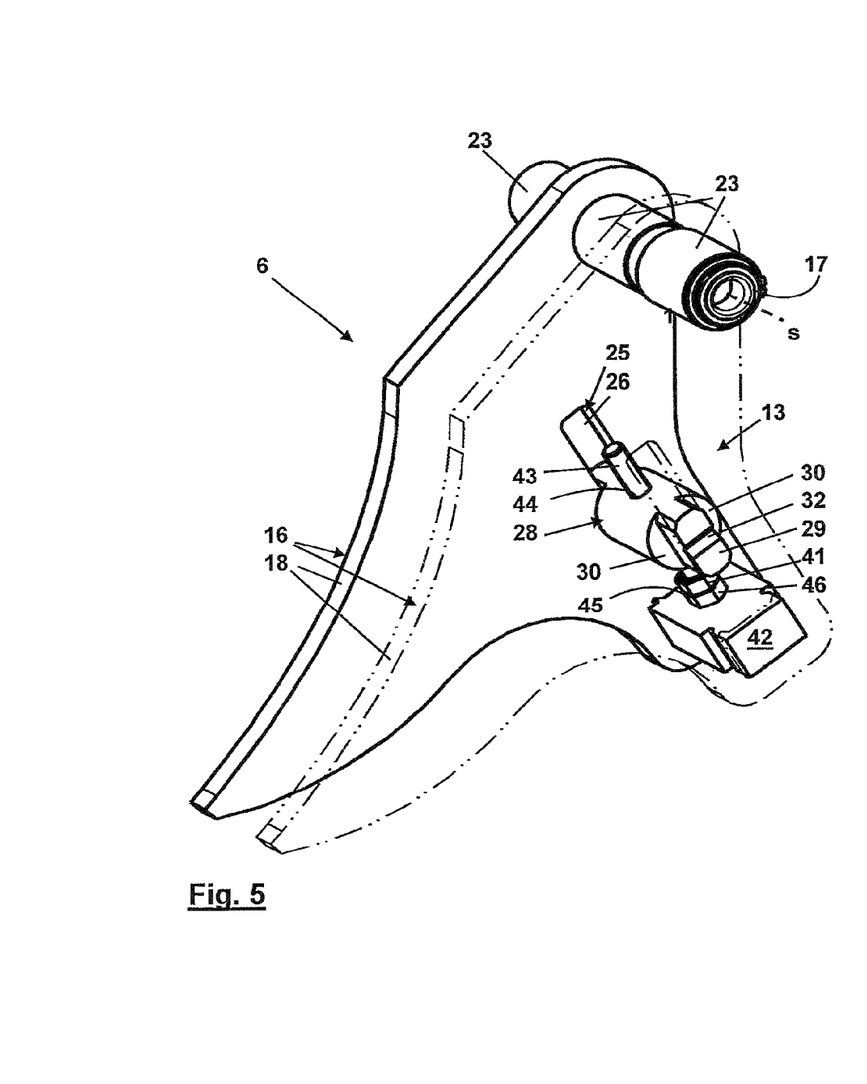
Figure 6:
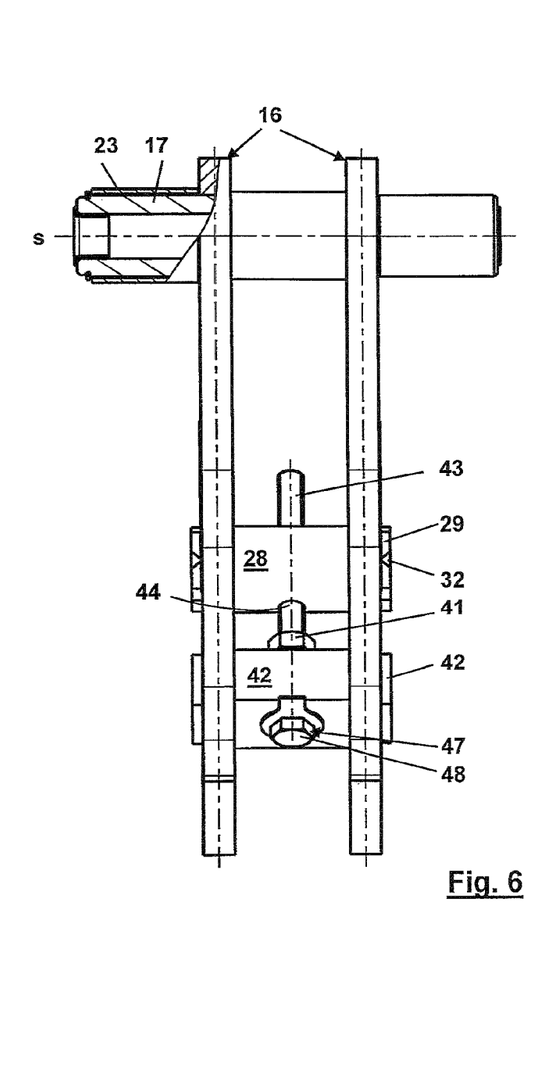

Retaining device 34 is explained in more detail on the basis of FIGS. 5 and 6, which each show a pair of parallel cam levers 16, transverse bolt 28, swivel pin 17 together with bushes 23, and retaining device 34 in a perspective top view and a bottom view, respectively. In this context, the front cam lever 16 in FIG. 5 is shown as a phantom image for greater clarity.

To support transverse bolt 28, a transverse block 42 with rectangular cross-section is provided parallel to transverse bolt 28. Transverse block 42 is arranged parallel to transverse bolt 28, and a distance from it in longitudinal axis l of slot 26, and with its end faces between cam levers 16, to which is it connected loosely and in non-rotating fashion via a push-in connection, in which context its end faces reach through cam lever 16, projecting slightly. Apart from its flattened guide ends 29, transverse bolt 28 has a circular cross-section. Guide ends 29 rest against slots 26. The push-in connection of transverse bolt 28 and transverse block 42 to the associated cam levers 16 makes them easy to install and dismantle.

Transverse bolt 28 is connected to transverse block 42 via a spindle 43, mounted in the middle of transverse block 28 in rotating fashion, and can be displaced in slot 26 in linear fashion by turning spindle 43. To this end, transverse bolt 28 displays a central first through-hole 44 with a thread (not explicitly shown here) engaged by spindle 43. Thus, transverse bolt 28, whose guide ends 29 are mounted in non-rotating fashion in slots 26, can be displaced in linear fashion in the longitudinal direction of slots 26 by turning spindle 43. Transverse block 42 displays a second through-hole 45, in which spindle 43 is mounted in rotating fashion.

Spindle 43, and thus transverse bolt 28 with the load end of spring 14, is supported on transverse block 42, and thus on cam levers 16, via a screw nut 46, which is fixed by a locknut and rests laterally on transverse block 42.

Figure 1:
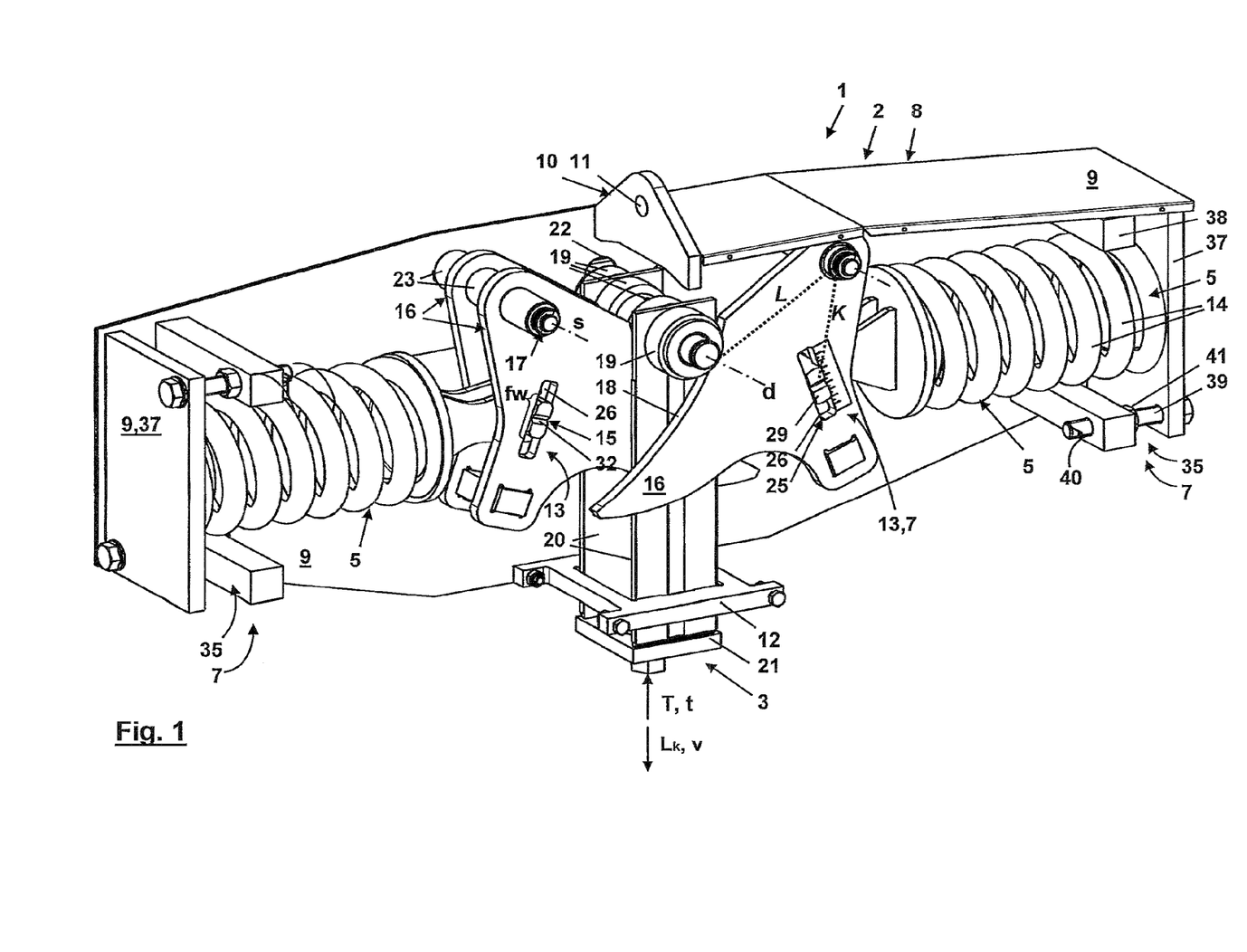
FIG. 1 A perspective view of a constant bearer, where parts of a housing have been omitted, FIG. 2 A perspective view of the constant bearer according to FIG. 1, where a front cam lever has been omitted, FIG. 3a A side view of the constant bearer in a starting position with a medium carrying force, where a right-hand spring of a spring system has been omitted, FIG. 3b A side view of the constant bearer according to FIG. 3a, but with a maximum carrying force, FIG. 3c A side view of the constant bearer according to FIG. 3a, but with a minimum carrying force, FIG. 4 A side view of the spring system of the constant bearer, FIG. 5 A perspective view of a pair of cam parts of the spring system, FIG. 6 A bottom view of the pair of cam parts according to FIG. 5, FIG. 7a A side view of the constant bearer as in FIG. 3a in an upper travel position, FIG. 7b A side view of the constant bearer according to FIG. 7a, but in a middle travel position, FIG. 7c A side view of the constant bearer according to FIG. 7a, but in a lower travel position, and FIG. 8 A perspective side view of the constant bearer with front housing side wall and inserted transport lock.

As can be seen from FIGS. 1, 5 and 6, for example, transverse block 42 is located beneath transverse bolt 28. Adjusting end 47 of spindle 43 reaches through transverse block 42, where the face end of adjusting end 47 is provided with a screw head 48, which is readily accessible from below. Thus, the prestress of spring system 4 can be changed by turning screw head 48 or spindle 43, especially if no housing bottom is provided, as is customary and envisaged in this practical example.

For secure, sliding mounting, guide end 29 passes through slot 26, slightly projecting beyond side wall 9, in which slot 26 is made.

It can clearly be seen from the partial section through swivel pin 17 in FIG. 6 that bushes 23 are slipped onto swivel pin 17, their face ends resting against cam levers 16 to separate them from each other and from housing 8. The axis of rotation d is designed as load roller axle 49, on which all four load rollers 19 are located, these again being separated from each other and from housing walls 9 by bushes 23 and by the attached load-bearing plates 20. Furthermore, the two ends of load roller axle 49 are each located in the vertical guide slit 22 of front and rear side walls 9 of housing 8, where only FIG. 8 also shows guide slit 22 in the front side wall 9 of housing 8.

FIGS. 7a to 7c show the displacement of load-bearing part 3 over carrying travel $t_w$ in three travel positions. FIG. 7a shows load-bearing part 3 in an upper travel position, in which it is maximally retracted into housing 8. Load-bearing part 3 is shown in a middle travel position in FIG. 7b and in a lower travel position in FIG. 7c, in which load-bearing part 3 is maximally extended from housing 8.

The linking of cam levers 16 to housing 8 slightly swivels springs 14. In this context, the geometries of constant bearer 1 are set in such a way that, in the middle travel position, springs 14 run almost perpendicularly to travel direction v. Moreover, the prestressing spring force V, set via correction device 13, remains constant.

Via cam levers 16, the carrying force T, in this instance with a vertical force component $T_s$ in carrying force direction and a horizontal force component $T_h$ in the direction of spring axis f and perpendicular to force component $T_s$, is exerted on load rollers 19 in every travel position of load-bearing part 3 over carrying travel $t_w$, where, thanks to the symmetrical structure or the symmetrical arrangement of springs 14, the horizontal force components $T_h$ cancel each other out and, together with the load (not shown) located on load-bearing element 21 of load-bearing part 3, ensure that the individual moving parts of constant bearer 1 are held together. Cam side faces 18 are profiled in such a way that force component $T_s$ increases from the lower travel position to the upper travel position in continuous, non-linear fashion to a calculated extent in such a way that, when springs 14 are compressed and relaxed, the changing spring forces of springs 14, and the direction of spring axis f changed by the above-mentioned swivelling of springs 14 with swivelling of cam levers 16, are completely compensated for and a constant carrying force T acts on the load over carrying travel $t_w$. In qualitative terms, carrying force T is roughly the sum of all vertical force components $T_s$ on load rollers 19. Since four cam levers 16 are provided in this instance, acting on associated load rollers 19, carrying force T is four times the force component $T_s$. Power arm K and work arm L are shown in FIGS. 7a to 7c to further illustrate the change in the force relationships. In this context, power arm K and prestressing spring force V remain constant, since no changes are made via correction device 13. Work arm L is extended as load-bearing part 3 is displaced downwards. Reference is also made in this respect to PCT/DE2006/001678.

Figure 8:
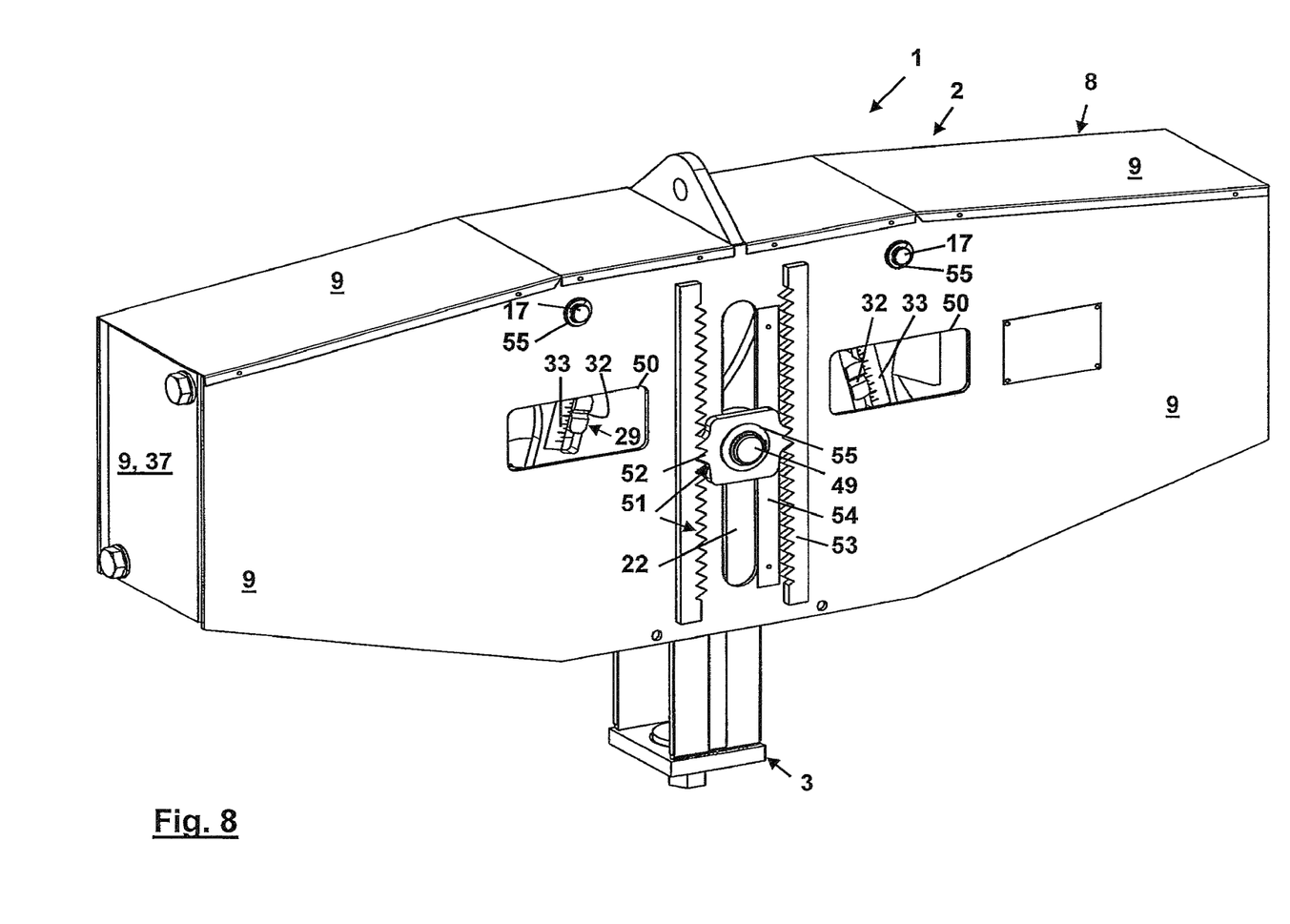

FIG. 8 shows constant bearer 1 in a perspective side view, as in FIG. 1, where the missing sides walls 9 of housing 8 have been added here. Integrated at a corresponding height in front side wall 9 in FIG. 8 are two housing windows 50 to give a view through to slot 26 and load scale 33.

As explained above, when suspension system 5 in set in the working position of constant bearer 1, a permanent spring force of spring system 4 is exerted on the load. In the absence of a load, e.g. during transport or storage of the constant bearer, load-bearing part 3 would be accelerated against housing 8 in carrying force direction t with the carrying force T intended for carrying the pipeline. Therefore, a transport lock 51, shown in FIG. 8, is provided to block load-bearing part 3 when constant bearer 1 is not loaded. Said transport lock 51 displays a toothed plate 52, which can be fitted on axis of rotation d or load roller axle 49 extending through guide slit 22, and which, when positioned between two toothed rails 53, provided on housing 8 and designed as blocking rails, engages said rails and thus blocks movement of load-bearing part 3 on carrying travel $t_w$. Toothed plate 52 can be removed when the load is attached to load-bearing element 21.

A travel scale 54 is provided parallel to, and to the side of, guide slit 22 to indicate the carrying travel $t_w$, the units of distance on said scale being cm and mm, as well as inches.

The face ends of load roller axle 49 and swivel pins 17 extend through front and rear side walls 9 and are secured by circlips 55 to prevent axial displacement or falling out. Side walls 9 of housing 8, connecting strap 10 and orifice 12 are, as not explicitly shown here, bolted to each other, whereas the components in housing 8 relating to compensation device 6 and correction device 13, as well as load rollers 19 and load-bearing plates 20, are connected loosely, meaning that the constant bearer is easy to assemble and dismantle.

<center>Constant Bearer</center>

<center>LIST OF REFERENCE NUMBERS</center>

1 Constant bearer
2 Fastening part
3 Load-bearing part
4 Spring system
5 Suspension system
6 Compensation device
7 Prestressing device
8 Housing
9 Side wall
10 Connecting strap
11 Fastening hole
12 Orifice 13 Correction device
14 Spring
15 Load point
16 Cam lever
17 Swivel pin
18 Cam side face
19 Load roller
20 Load-bearing plate
21 Load-bearing element
22 Guide slit
23 Bush
24 Rolling point
25 Guide
26 Slot
27 Load abutment
28 Transverse bolt
29 Guide end
30 Shoulder
31 Guide side face
32 Marking
33 Load scale
34 Retaining device
35 Adjusting device
36 Fastening abutment
37 Tensioning wall
38 Transverse strut
39 Tensioning screw
40 Through-hole
41 Locknut
42 Transverse block
43 Spindle
44 First through-hole
45 Second through-hole
46 Screw nut
47 Adjusting end
48 Screw head
49 Load roller axle
50 Housing window
51 Transport lock
52 Toothed plate
53 Toothed rail
54 Travel scale
55 Circlip
d Axis of rotation
f Spring axis
$f_w$ Guide travel
K Power arm
l Longitudinal axis
Lk Load force
L Work arm
s Swivelling axis
t Carrying force direction
T Carrying force
$T_s$ Vertical carrying force component
$T_h$ Horizontal carrying force component
$t_w$ Carrying travel
v Travel direction
V Prestressing spring force
μ Correction angle

The invention claimed is:

1. Constant bearer for loads which are displaced, in particular for pipelines and the like, having a fastening part, a load-bearing part and a spring system which is arranged between the fastening part and the load-bearing part for generating a carrying force which remains constant over a carrying travel of the load-bearing part with respect to the fastening part, where the spring system has a suspension system for absorbing the load, a compensation device for compensating for changing spring forces of the suspension system over the carrying travel, and a prestressing device for setting a prestressing force of the suspension system, wherein the compensation device displays a cam part coupled to the load-bearing part, in that the suspension system encompasses at least one spring that has a load side acting on a load point on the cam part to transmit force from the suspension system to the load-bearing part, wherein the cam part comprises at least one cam lever which is mounted in a swivelling way about a swivelling axis on the fastening part, and wherein a correction device is provided to correct deviations in the carrying force over the carrying travel resulting from a changed prestressing spring force, characterized in that the load point is supported at a distance to the swivelling axis on the cam lever in a guide the load point is moveable and fixable guided in, wherein the distance forms a power arm for transmitting the spring force on the load-bearing part and the orientation of the power arm relative to the load bearing part and its arm length are changed by moving the load point in the guide.

2. Constant bearer according to claim 1, characterized in that the at least one spring has a force side supported on a force point on the fastening part and in that, to correct deviations in the carrying force over the carrying travel resulting from a changed prestressing spring force, the load point and/or the force point are designed to be movable relative to the cam part and over an adjusting travel with a directional component perpendicular to the spring axis of the respective spring and in a plane corresponding or parallel to the carrying force, and to be fixable in a particular correction position.

3. Constant bearer according to claim 2, characterized in that the correction device displays a guide for the force point of one or more springs.

4. Constant bearer according to claim 1, characterized in that, for the purpose of adjustment in the guide, the load point is displaceable on a guide travel with a directional component in the longitudinal axis of the spring and with a directional component perpendicular to the longitudinal axis of the spring and in the same plane as the carrying force, and can be fixed in non-positive and/or positive fashion in a desired setting position in the guide relative to the cam part.

5. Constant bearer according to claim 1, characterized in that the suspension system displays two springs designed as compression springs, in that the compression springs are arranged opposite each other, symmetrically to the carrying force, and in that the load side of the compression springs in each case acts on a load point on the cam part or on a cam part respectively assigned to them.

6. Constant bearer according to claim 5, characterized in that, in a starting position, the springs are located on a common spring axis or inclined relative to each other.

7. Constant bearer according to claim 6, characterized in that, in the starting position, the springs are arranged to converge on each other with a directional component opposite to the carrying force.

8. Constant bearer according to claim 1, characterized in that the at least one cam lever displays two side faces lying opposite each other in its longitudinal extension, a first side face and a second side face, in that the load side of the spring is mounted in swivelling fashion in an area of the first side face facing towards it, or on the first side face facing towards it, or is supported on it, and in that the second side face is designed as a cam side face, on which the load-bearing part rests in sliding or rolling fashion.

9. Constant bearer according to claim 8, characterized in that the load-bearing part displays a load roller with an axis of rotation perpendicular to the spring axis and perpendicular to the carrying force direction, and in that the cam side face rests on the load roller in rolling fashion in a plane perpendicular to the axis of rotation.

10. Constant bearer according to claim 7, characterized in that a point or area of the cam side face rests on the load-bearing part, said point or area moving as the load-bearing part moves over the carrying travel and pointing in the direction of the carrying force with a magnitude that changes over the carrying travel.

11. Constant bearer according to claim 1, characterized in that the cam part is designed in flat form with a larger side face, in that the cam part is mounted on the fastening part of the constant bearer in a swivelling bearing permitting swivelling movement about a swivelling axis perpendicular to its larger side face, as well as perpendicular to the longitudinal axis of the spring and to the carrying travel, and in that the guide is integrated in the cam part at a distance from the swivelling bearing.

12. Constant bearer according to claim 11, characterized in that the guide displays a slot or slit for accommodating and guiding the load point.

13. Constant bearer according to claim 12, characterized in that the longitudinal extension of the slot is of linear design.

14. Constant bearer according to claim 13, characterized in that the slot and the power arm include a correction angle greater than 0°.

15. Constant bearer according to claim 2, characterized in that the force side of the spring is mounted on the fastening part in swivelling fashion.

16. Constant bearer according to claim 12, characterized in that, in the starting position, the load point of the spring is located in the middle of the slot in relation to the longitudinal extension of the slot.

17. Constant bearer according to claim 3, characterized in that the load point is supported on the cam part in the guide by means of a retaining device.

18. Constant bearer according to claim 12, characterized in that two cam levers, each with a slot for guiding a load point of the associated spring, are provided for each spring, where the cam levers are located a distance apart on the fastening part, parallel to each other and in alignment with the carrying force, as well as perpendicularly to the spring axis and in swivelling fashion on a common swivel pin.

19. Constant bearer according to claim 18, characterized in that the spring is supported in the middle of a first transverse element in the form of a transverse bolt, a guide end of which is in each case mounted in sliding fashion in one of the guides in the cam levers.

20. Constant bearer according to claim 19, characterized in that the guide end is laterally flattened from two sides, in each case forming a shoulder and two parallel guide side faces, and in that the guide end rests in non-rotating and sliding fashion against the inner side faces of the guide assigned to it.

21. Constant bearer according to claim 19, characterized in that, to support the transverse bolt, a second transverse element is provided in the form of a transverse block bolt, being arranged parallel to, and a distance from, the longitudinal axis of the slot and connected to the cam levers at one end, and in that the transverse bolt is connected to the transverse block via a spindle mounted in rotating fashion in the middle of the transverse block and can be displaced in the slot by turning the spindle.

22. Constant bearer according to claim 21, characterized in that the transverse block is located underneath the transverse bolt in installed position, an adjusting end of the spindle reaching through the transverse block, and in that the adjusting end is provided with a screw head for turning the spindle.

23. Constant bearer according to claim 1, characterized in that the prestressing device displays an adjusting device for presetting the prestressing force.

24. Constant bearer according to claim 23, characterized in that the spring is located in a fastening abutment on the fastening side and/or in a load abutment on the load side, where the fastening abutment and/or the load abutment are displaceable in the direction of the spring axis and lockable.

25. Constant bearer according to claim 24, characterized in that the fastening abutment displays a side wall of the housing, designed as a tensioning wall, on which the fastening side of the spring is supported and which can be adjusted by displacement in the direction of the spring axis and fixed via a screw device.

26. Constant bearer according to claim 1, characterized in that the correction device is directly coupled to the prestressing device in the load point.

27. Constant bearer according to claim 1, characterized in that the at least one spring is a compression spring.

* * * * *